(12) United States Patent
Aizawa et al.

(10) Patent No.: US 9,216,442 B2
(45) Date of Patent: Dec. 22, 2015

(54) GAS-LIQUID SEPARATOR AND POLISHING APPARATUS

(71) Applicant: EBARA CORPORATION, Tokyo (JP)

(72) Inventors: Hideo Aizawa, Tokyo (JP); Tadakazu Sone, Tokyo (JP); Masao Umemoto, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 276 days.

(21) Appl. No.: 13/789,733

(22) Filed: Mar. 8, 2013

(65) Prior Publication Data

US 2013/0240000 A1   Sep. 19, 2013

(30) Foreign Application Priority Data

Mar. 14, 2012   (JP) .................................. 2012-56679

(51) Int. Cl.
| | |
|---|---|
| *B04C 3/00* | (2006.01) |
| *B08B 3/14* | (2006.01) |
| *B01D 19/00* | (2006.01) |
| *B24B 57/02* | (2006.01) |

(52) U.S. Cl.
CPC .............. *B08B 3/14* (2013.01); *B01D 19/0057* (2013.01); *B24B 57/02* (2013.01); *B04C 2003/006* (2013.01)

(58) Field of Classification Search
CPC ............................................... B04C 2003/006
See application file for complete search history.

(56) References Cited

U.S. PATENT DOCUMENTS 6,106,375 A *   8/2000   Furusawa ......................... 451/67

FOREIGN PATENT DOCUMENTS

| | | |
|---|---|---|
| CN | 345635 | 12/2008 |
| JP | 62-109709 | 7/1987 |
| JP | 5-28408 | 4/1993 |
| JP | 10-123336 | 5/1998 |
| JP | 11-320406 | 11/1999 |
| JP | 2002-324561 | 11/2002 |
| JP | 2003-126633 | 5/2003 |
| JP | 2008-038712 | 2/2008 |
| JP | 2008-038714 | 2/2008 |

* cited by examiner

*Primary Examiner* — Jason Ko
(74) *Attorney, Agent, or Firm* — Wenderoth, Lind & Ponack, L.L.P.

(57) ABSTRACT

A gas-liquid separator separates gas-liquid two-phase flow into a gas and a liquid. The gas-liquid separator includes: a container having a bottom and a side portion, the bottom having a liquid discharge outlet and the side portion having a gas discharge outlet; a gas-liquid introduction pipe for introducing a gas-liquid two-phase flow into the container, the gas-liquid introduction pipe extending downward from above the container and having a lower end located in an interior of the container, the gas discharge outlet of the container being located above the lower end of the gas-liquid introduction pipe; and a guide device disposed in the gas-liquid introduction pipe and configured so as to impart a swirling motion to the gas-liquid two-phase flow in the gas-liquid introduction pipe.

4 Claims, 6 Drawing Sheets

GAS-LIQUID SEPARATOR AND POLISHING APPARATUS

CROSS REFERENCE TO RELATED APPLICATIONS

This document claims priority to Japanese Patent Application No. 2012-056679, filed on Mar. 14, 2012, the entire contents of which are hereby incorporated by reference.

BACKGROUND OF THE INVENTION

1. Field of the Invention

The present invention relates to a gas-liquid separator for separating a gas-liquid two-phase flow into a gas and a liquid. Such gas-liquid two-phase flow is generated from an apparatus using a liquid, such as a polishing apparatus for polishing a substrate surface while supplying a polishing liquid onto a polishing surface. The present invention also relates to a polishing apparatus provided with such a gas-liquid separator.

2. Description of the Related Art

In a polishing apparatus which polishes a substrate surface while supplying a polishing liquid to a polishing surface, a gas-liquid two-phase flow is generated which is constituted by a polishing liquid, containing polishing agent and polishing abrasives therein, and a gas, such as nitrogen gas, supplied during polishing or cleaning of the substrate. Such a gas-liquid two-phase flow may be generated as a result of mixture of a waste cleaning liquid, used in cleaning of the polishing surface, and the gas such as nitrogen gas, or may be generated when a gas is mixed into the polishing liquid or the waste cleaning liquid.

In order to prevent such a gas-liquid two-phase flow from flowing into an exhaust line and causing clogging of the exhaust line with the liquid, it is common practice in a polishing apparatus to provide a gas-liquid separator for separating the gas-liquid two-phase flow into a gas and a liquid and discharging them.

FIG. 1 is a vertical cross-sectional front view showing an example of a conventional gas-liquid separator. As shown in FIG. 1, the gas-liquid separator includes a cylindrical separator body 100 with an open top and a closed bottom, and a gas-liquid introduction pipe 104 for introducing a gas-liquid two-phase flow, which has been generated on a polishing table (not shown) or the like and recovered by a drain receiver 102, into the separator body 100. The gas-liquid introduction pipe 104 is coupled to a lower end of a connecting pipe 106 and extends downward. The connecting pipe 106 is connected to a bottom of the drain receiver 102 and extends vertically. The gas-liquid introduction pipe 104 has its lower end located near the bottom of the separator body 100. The bottom of the separator body 100 is provided with a liquid discharge outlet 100a communicating with a drain pipe 108. A side portion of the separator body 100 is provided with a gas discharge outlet 100b communicating with an exhaust pipe 110. This gas discharge outlet 100b is located at a position above the lower end of the gas-liquid introduction pipe 104.

The gas-liquid two-phase flow, recovered in the drain receiver 102, flows through the gas-liquid introduction pipe 104 and is introduced into the interior of the separator body 100. The liquid, which has been separated from the gas-liquid two-phase flow and collected on the bottom of the separator body 100, is discharged through the liquid discharge outlet 100a and the drain pipe 108. The gas, which has been separated from the gas-liquid two-phase flow and has ascended to the upper portion of the separator body 100, is discharged through the gas discharge outlet 100b and the exhaust pipe 110.

In order to prevent the gas-liquid two-phase flow in the gas-liquid introduction pipe 104 from flowing into the exhaust pipe 110, the lower end of the gas-liquid introduction pipe 104 has a tapered portion (cutout portion) 104a on the opposite side from the exhaust pipe 110 (the side not facing the exhaust pipe 110).

There has been proposed a waste liquid and waste gas treatment apparatus which, in order to efficiently discharge mist of polishing liquid generated during polishing, simultaneously collects a polishing liquid and mist of polishing liquid in a drain receiver, and introduces the mixture into a gas-liquid separation means through a common discharge pipe to separate the mixture into a waste liquid and a waste gas and discharge them (see Japanese Patent Laid-Open Publication No. H10-123336). There has also been proposed a gas-liquid separator which has a housing for storing a liquid discharged from a liquid discharge section of a separator body. This housing is provided with a liquid discharge outlet and a gas discharge outlet (see Japanese Patent Laid-Open Publication No. 2008-38712 and Japanese Patent Laid-Open Publication No. 2008-38714). Further, there has been proposed a gas-liquid separator which has a spiral plate installed in a tubular nozzle for introducing a gas-liquid mixture into a tank (see Japanese Utility Model Laid-Open Publication No. S62-109709).

The gas-liquid separator shown in FIG. 1 has the advantage that it has relatively compact structure and is suitable for installation e.g. at a bottom of a polishing apparatus. However, the gas-liquid two-phase flow descends freely in the gas-liquid introduction pipe 104 without any obstructions to impinge on the bottom of the separator body 100 with high impact. Therefore, when a relatively large amount of gas-liquid two-phase flow is treated, a large amount of mist will be produced in the separator body 100. Moreover, if a liquid to be treated contains a foaming material, foaming of the liquid is promoted, resulting in production of a large amount of bubbles in the separator body 100. When a large amount of mist or bubbles is produced, the mist or bubbles may reach the exhaust pipe 110 and the liquid may remain in the exhaust pipe 110, thus causing problems, such as leakage thereof.

Particularly in a polishing apparatus, a polishing liquid containing a foaming additive, such as a dispersant, is used. In addition, a large amount of water and gas, such as nitrogen gas, are used for spray cleaning (atomizer cleaning) after polishing of a substrate. Therefore, a large amount of mist or bubbles is likely to be generated in the separator body 100.

None of the above-described patent documents addresses such a problem of the generation of the mist or bubbles due to collision of the gas-liquid two-phase flow with the bottom of the separator body.

SUMMARY OF THE INVENTION

The present invention has been made in view of the above situation. It is therefore an object of the present invention to provide a gas-liquid separator with compact structure which can separate a gas-liquid two-phase flow into a gas and a liquid while minimizing generation of mist or bubbles even when a large amount of liquid is treated or even when a liquid to be treated contains a foaming material, as in a case of using a waste cleaning liquid in a polishing apparatus. Further, it is another object of the present invention to provide a polishing apparatus including such a gas-liquid separator.

In order to achieve the object, the present invention provides a gas-liquid separator including: a container having a bottom and a side portion, the bottom having a liquid discharge outlet and the side portion having a gas discharge outlet; a gas-liquid introduction pipe for introducing a gas-liquid two-phase flow into the container, the gas-liquid introduction pipe extending downward from above the container and having a lower end located in an interior of the container, the gas discharge outlet of the container being located above the lower end of the gas-liquid introduction pipe; and a guide device disposed in the gas-liquid introduction pipe and configured so as to impart a swirling motion to the gas-liquid two-phase flow in the gas-liquid introduction pipe.

In a preferred aspect of the present invention, the guide device comprises a spiral flow-guide plate whose side end surfaces are secured to a circumferential surface of the gas-liquid introduction pipe and whose upper and lower end surfaces are twisted at least 180 degrees.

In a preferred aspect of the present invention, the guide device comprises a plurality of semicircular flow-guide slope plates each having a circular arc portion secured to an inner circumferential surface of the gas-liquid introduction pipe, the plurality of semicircular flow-guide slope plates being disposed alternately at angular intervals of 180 degrees and arranged at predetermined intervals along a height direction of the gas-liquid introduction pipe, and each flow-guide slope plate being inclined downward with respect to a horizontal plane along a swirling direction of the gas-liquid two-phase flow and being inclined downward with respect to a horizontal plane along an axial direction of the gas-liquid introduction pipe.

In a preferred aspect of the present invention, the gas-liquid separator further includes: an exhaust pipe coupled to the gas discharge outlet, the exhaust gas being inclined upward at a predetermined angle with respect to a horizontal plane.

Another aspect of the present invention provides a polishing apparatus including: a polishing table having a polishing surface; a top ring for holding a substrate and pressing it against the polishing surface of the polishing table; a processing liquid supply nozzle for supplying a processing liquid to the polishing surface of the polishing table; a drain receiver, disposed around the polishing table, for recovering a gas-liquid two-phase flow that has been removed from the polishing table; and the gas-liquid separator.

According to the present invention, the gas-liquid separator can separate a gas-liquid two-phase flow into a gas and a liquid with a relatively compact structure. The guide device imparts the swirling motion to the gas-liquid two-phase flow in the gas-liquid introduction pipe and can therefore suppress an increase in a vertical velocity of the gas-liquid two-phase flow. As a result, an impact of the gas-liquid two-phase flow on the bottom of the container can be reduced. Therefore, even when a large amount of liquid is treated or even when a liquid to be treated contains a foaming material as in a case of using a waste cleaning liquid in a polishing apparatus, generation of mist or bubbles due to the collision of the gas-liquid two-phase flow with the bottom of the container can be suppressed.

DETAILED DESCRIPTION OF THE PREFERRED EMBODIMENTS

Figure 1:
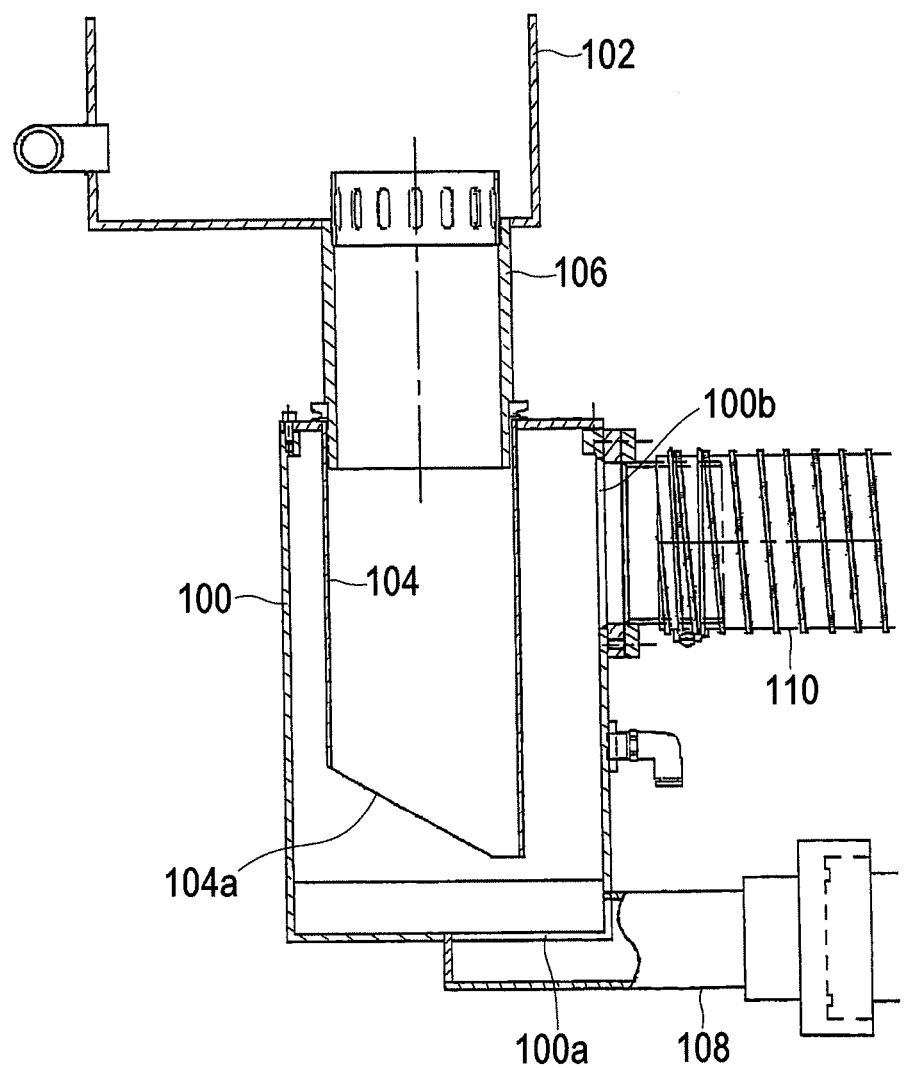
FIG. 1 is a vertical cross-sectional front view showing an example of a conventional gas-liquid separator.
Figure 2:
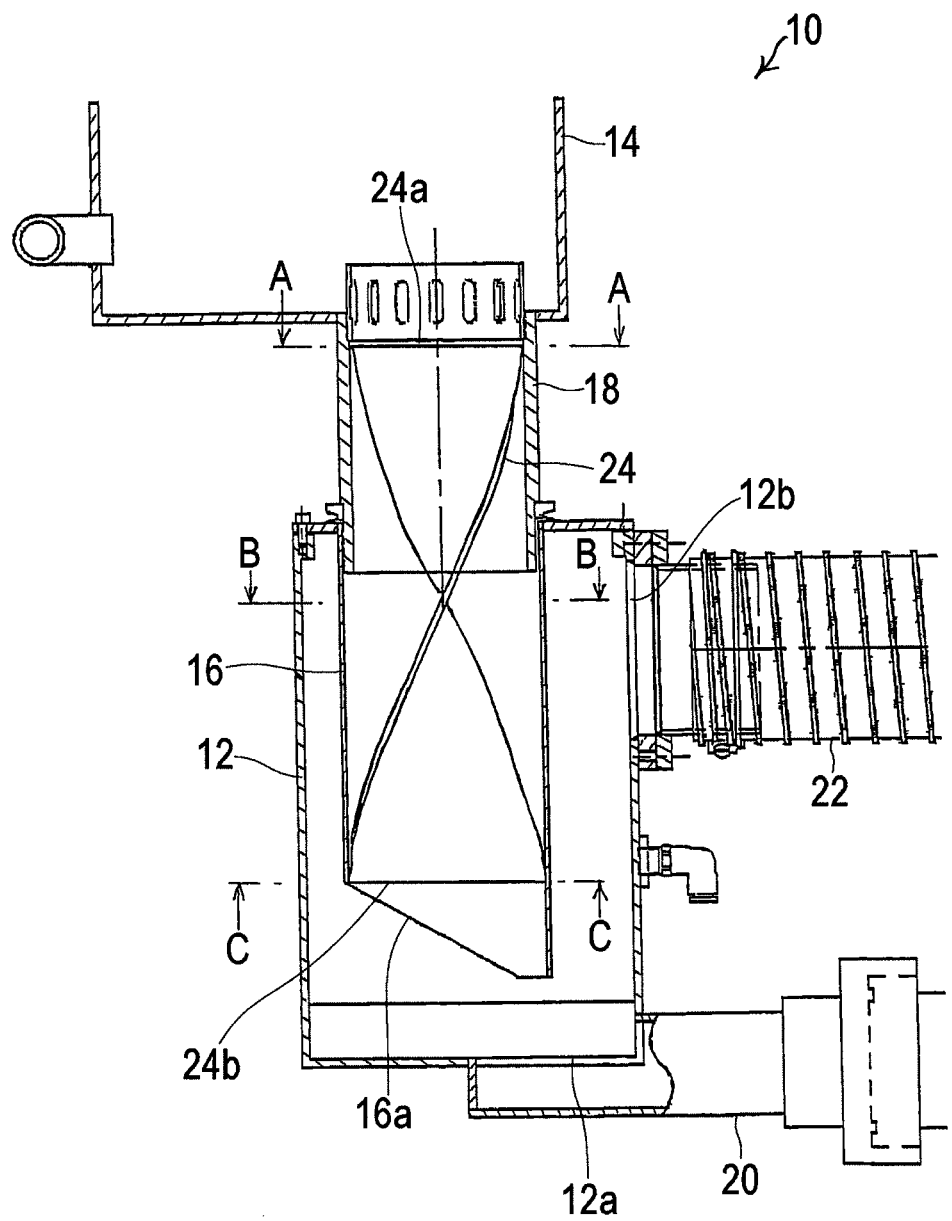
FIG. 2 is a vertical cross-sectional front view of a gas-liquid separator according to an embodiment of the present invention.

Preferred embodiments of the present invention will now be described with reference to the drawings. FIG. 2 is a vertical cross-sectional front view of a gas-liquid separator according to an embodiment of the present invention. As shown in FIG. 2, a gas-liquid separator 10 includes a cylindrical separator body (as a container or vessel) 12 with an open top and a closed bottom, and a gas-liquid introduction pipe 16 for introducing a gas-liquid two-phase flow, which has been generated on a polishing table 30 (shown in FIG. 4) and recovered by a drain receiver 14, into the separator body 12. The gas-liquid introduction pipe 16 extends downward and is coupled to a lower end of a connecting pipe 18, which is coupled to a bottom of the drain receiver 14 and extends vertically. The gas-liquid introduction pipe 16 has its lower end located near the bottom of the separator body 12. The bottom of the separator body 12 is provided with a liquid discharge outlet 12a communicating with a drain pipe 20. A side portion (a side wall) of the separator body 12 is provided with a gas discharge outlet 12b communicating with an exhaust pipe 22. This gas discharge outlet 12b is located at a position above the lower end of the gas-liquid introduction pipe 16.

In order to prevent the gas-liquid two-phase flow in the gas-liquid introduction pipe 16 from flowing into the exhaust pipe 22, the lower end of the gas-liquid introduction pipe 16 has a tapered portion (cutout portion) 16a on an opposite side from the exhaust pipe 22 (a side not facing the exhaust pipe 22).

In the gas-liquid introduction pipe 16, a spiral flow-guide plate 24 is provided as a guide device for imparting a swirling motion to the gas-liquid two-phase flow in the gas-liquid introduction pipe 16. This spiral flow-guide plate 24 has side end surfaces secured to an inner surface of the gas-liquid introduction pipe 16. In this embodiment the spiral flow-guide plate (guide device) 24 extends through approximately an entire length of the gas-liquid introduction pipe 16 other than the tapered portion 16a, and further extends upward to reach approximately an upper end of the connecting pipe 18.

Figure 3A:
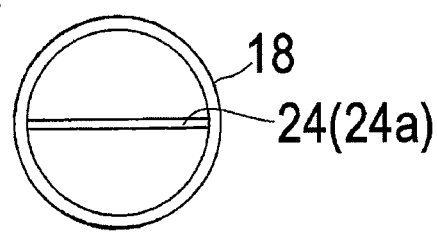
FIG. 3A is a cross-sectional view taken along line A-A shown in FIG. 2.
Figure 3B:
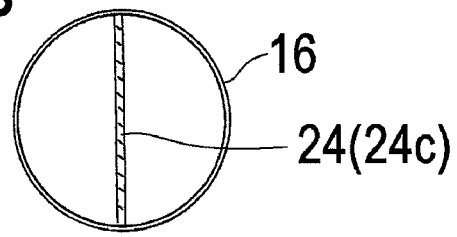
FIG. 3B is a cross-sectional view taken along line B-B shown in FIG. 2.
Figure 3C:
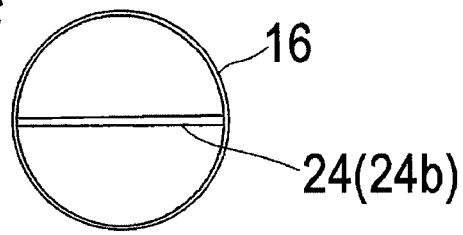
FIG. 3C is a cross-sectional view taken along line C-C shown in FIG. 2.

The spiral flow-guide plate (guide device) 24 may be made of stainless steel, and may be formed by twisting both ends of a long flat plate in a direction perpendicular to a longitudinal direction of the flat plate by 180 degrees. More specifically, as shown in FIGS. 3A through 3C, an upper end surface 24a and a lower end surface 24b of the spiral flow-guide plate 24 are parallel to each other, while a horizontal cross-section 24c at a center of the spiral flow-guide plate 24 with respect to its longitudinal direction is perpendicular to the upper end surface 24a and to the lower end surface 24b.

Although in this embodiment the spiral flow-guide plate 24 is arranged so as to extend approximately the entire length of the gas-liquid introduction pipe 16 and the connecting pipe 18, the spiral flow-guide plate 24 may be provided only in the gas-liquid introduction pipe 16.

In operation of the gas-liquid separator 10, the gas-liquid two-phase flow, recovered in the drain receiver 14, flows through the connecting pipe 18 and the gas-liquid introduction pipe 16 in this order, and is introduced into the interior of the separator body 12. A liquid, which has been separated from the gas-liquid two-phase flow and collected on the bottom of the separator body 12, is discharged through the liquid discharge outlet 12a and the drain pipe 20. A gas, which has been separated from the gas-liquid two-phase flow and has ascended to the top of the separator body 12, is discharged through the gas discharge outlet 12b and the exhaust pipe 22.

When the gas-liquid two-phase flow flows through the connecting pipe 18 and the gas-liquid introduction pipe 16, the gas-liquid two-phase flow makes the swirling motion caused by the spiral flow-guide plate (guide device) 24 provided in the connecting pipe 18 and the gas-liquid introduction pipe 16. This swirling motion can suppress an increase in vertical velocity component of the gas-liquid two-phase flow, thereby reducing the impact of the gas-liquid two-phase flow on the bottom of the separator body 12. Therefore, the generation of mist or bubbles due to the collision of the gas-liquid two-phase flow with the bottom of the separator body 12 can be minimized even when a large amount of liquid is treated or even when a liquid to be treated contains a foaming material, as in a case of a waste cleaning liquid in a polishing apparatus.

Because the spiral flow-guide plate (guide device) 24 is configured to impart the swirling motion to the gas-liquid two-phase flow in the connecting pipe 18 and the gas-liquid introduction pipe 16, the gas-liquid separator 10 of this embodiment can effectively separate the gas-liquid two-phase flow into a gas and a liquid with relatively compact structure.

As described above, the side end surfaces of the spiral flow-guide plate 24 are secured to the inner circumferential surface of the gas-liquid introduction pipe 16 (and to the inner surface of the connecting pipe 18), and the upper and lower end surfaces are twisted at least 180 degrees. Use of such spiral flow-guide plate 24 as the guide device can maintain a sufficient effective cross-sectional area of the gas-liquid introduction pipe 16 (and the connecting pipe 18), thereby preventing an increase in the resistance to the gas-liquid two-phase flow flowing through the gas-liquid introduction pipe 16 (and the connecting pipe 18).

The exhaust pipe 22, communicating with the gas discharge outlet 12b, is preferably inclined upward at a predetermined angle with respect to a horizontal plane, so that a liquid, condensed in the exhaust pipe 22, can be returned to the separator body 12 of the gas-liquid separator 10.

Figure 4:
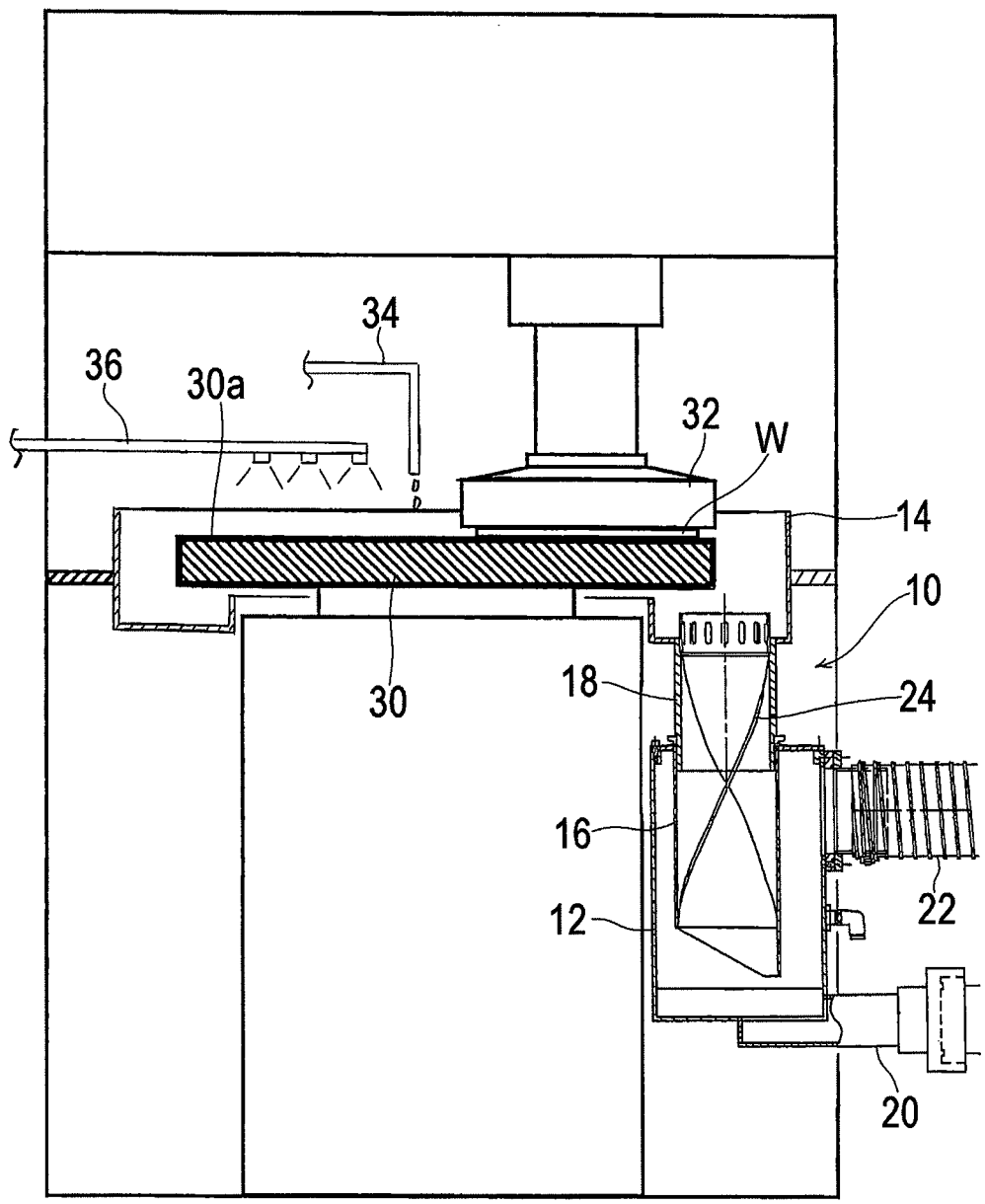
FIG. 4 is a schematic view of a polishing apparatus provided with the gas-liquid separator shown in FIGS. 2 and 3.

FIG. 4 schematically shows a polishing apparatus provided with the gas-liquid separator 10 shown in FIGS. 2 and 3. The polishing apparatus includes a rotatable polishing table 30 having a polishing surface 30a, a rotatable top ring 32 for holding a substrate W, such as a semiconductor wafer, and pressing it against the polishing surface 30a of the polishing table 30, a processing liquid supply nozzle 34 for supplying a processing liquid, such as a polishing liquid or a dressing liquid (e.g., water) to the polishing surface 30a of the polishing table 30, a dresser (not shown) for dressing the polishing surface 30a of the polishing table 30, and an atomizer 36 for spraying an atomized fluid mixture of a liquid (e.g., pure water) and a gas (e.g., nitrogen gas) through one or more nozzles onto the polishing surface 30a of the polishing table 30.

The annular drain receiver 14 for recovering the gas-liquid two-phase flow generated on the polishing table 30 is secured to the polishing apparatus so as to surround the polishing table 30. The connecting pipe 18 of the gas-liquid separator 10 is mounted to the bottom of the drain receiver 14.

Polishing of the substrate W is performed by pressing the substrate W, held and being rotated by the top ring 32, against the polishing surface 30a of the rotating polishing table 30 while supplying the polishing liquid to the polishing surface 30a from the processing liquid supply nozzle 34. During polishing of the substrate W, the gas-liquid two-phase flow containing the polishing liquid and air, which has been mixed into the polishing liquid, is produced. This gas-liquid two-phase flow is discharged from the polishing table 30 and recovered in the drain receiver 14. The gas-liquid two-phase flow recovered by the drain receiver 14 then flows into the gas-liquid separator 10, where the gas-liquid two-phase flow is separated into a gas and a liquid. The liquid is discharged through the drain pipe 20 to the exterior of the gas-liquid separator 10, while the gas is discharged through the exhaust pipe 22 to the exterior of the gas-liquid separator 10.

As described above, according to the gas-liquid separator 10, the impact of the gas-liquid two-phase flow on the bottom of the separator body 12 can be effectively reduced. The production of bubbles due to the impact can therefore be significantly reduced even when the polishing liquid contains a foaming additive, such as a dispersant.

In order to wash out polishing debris, polishing particles, and the like deposited on the polishing surface 30a of the polishing table 30, cleaning of the polishing surface 30a is performed by spraying the atomized fluid mixture of the liquid (e.g., pure water) and the gas (e.g., nitrogen gas) onto the polishing surface 30a from the one or more nozzles of the atomizer 36. This atomized fluid mixture forms a gas-liquid two-phase flow, which is discharged from the polishing table 30 and recovered by the drain receiver 14. The gas-liquid two-phase flow, recovered by the drain receiver 14, flows into the gas-liquid separator 10, where the gas-liquid two-phase flow is separated into a gas and a liquid. The liquid is discharged through the drain pipe 20 to the exterior of the gas-liquid separator 10, while the gas is discharged through the exhaust pipe 22 to the exterior of the gas-liquid separator 10.

During cleaning of the polishing surface 30a, a relatively large amount of the gas-liquid two-phase flow flows into the gas-liquid separator 10. Even when a large amount of the gas-liquid two-phase flow is treated, the generation of mist or bubbles due to the collision can be significantly reduced because the impact of the gas-liquid two-phase flow on the bottom of the separator body 12 can be effectively reduced.

Figure 5:
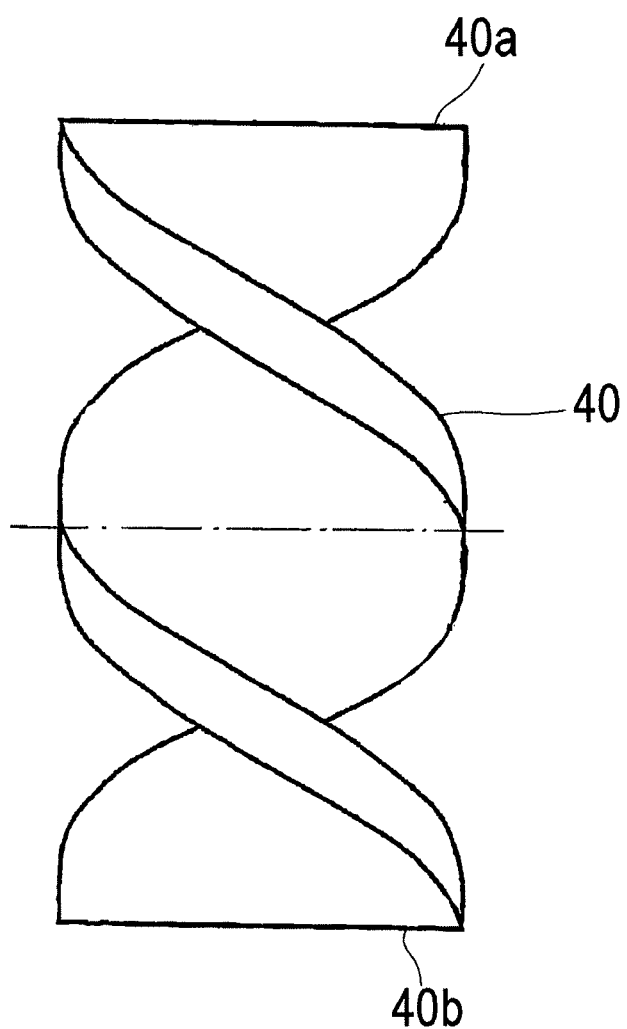
FIG. 5 is a front view of another example of a spiral flow-guide plate for use as a guide device.

In this embodiment, the upper end surface 24a and the lower end surface 24b of the spiral flow-guide plate 24 are twisted 180 degrees as described above. Instead, it is possible to use as a guide device a spiral flow-guide plate 40 having an upper end surface 40a and a lower end surface 40b which are twisted 360 degrees as shown in FIG. 5. This spiral flow-guide plate (guide device) 40 is shaped such that upper and lower spiral flow-guide plates, each twisted 180 degrees, are bonded together along a dashed-dotted line shown in FIG. 5.

Figure 6A:
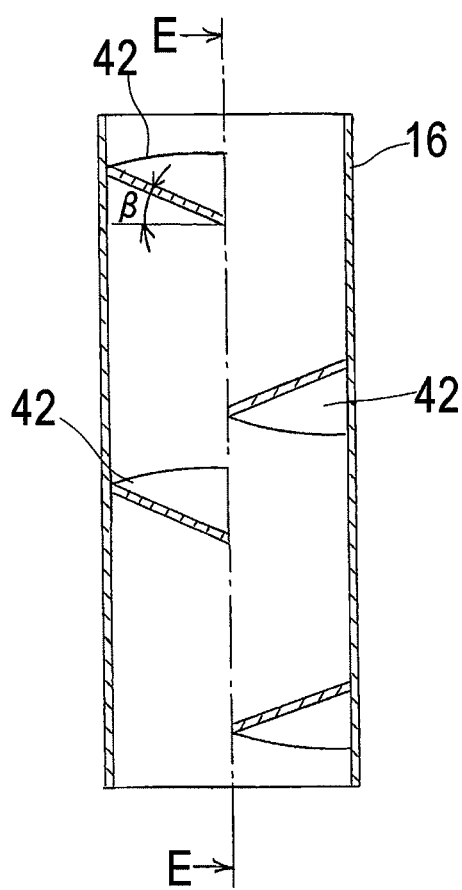
FIG. 6A is a cross-sectional view (taken along line D-D shown in FIG. 6B) showing another guide device together with a gas-liquid introduction pipe.
Figure 6B:
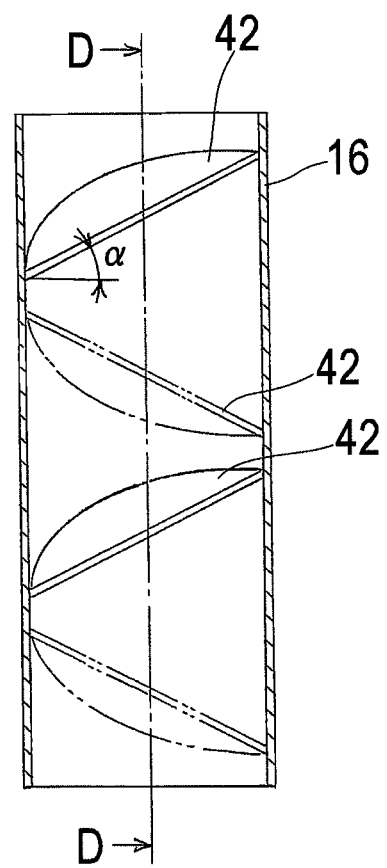
FIG. 6B is a cross-sectional view taken along line E-E shown in FIG. 6A.

FIGS. 6A and 6B show another example of the guide device together with the gas-liquid introduction pipe. While the single twisted spiral flow-guide plate 24 or 40 is used as the guide device in the above-described embodiments, the guide device in this embodiment is constituted by a plurality of semicircular flow-guide slope plates 42. Each flow-guide slope plate 42 has a circular arc portion secured to the inner circumferential surface of the gas-liquid introduction pipe 16. The flow-guide slope plates 42 are arranged alternately at angular intervals of 180 degrees, i.e., disposed alternately on the right side and the left side of a plane passing through a central axis of the gas-liquid introduction pipe 16 as shown in FIG. 6A, and are arranged at predetermined intervals along a height direction of the gas-liquid introduction pipe 16. The flow-guide slope plates 42 are each inclined downward along the swirling direction of the gas-liquid two-phase flow at an angle α with respect to a horizontal plane and further inclined downward along an axial direction of the gas-liquid introduction pipe 16 at an angle β with respect to a horizontal plane.

In FIG. 6B, the flow-guide slope plates 42, which lie on the right side of the plane passing through the central axis of the gas-liquid introduction pipe 16 shown in FIG. 6A, are shown by imaginary lines (two-dot chain lines).

The gas-liquid two-phase flow, flowing in the gas-liquid introduction pipe 16, is guided downward along a circumferential direction, i.e., in a spiral manner, by the flow-guide slope plates (guide device) 42, so that the gas-liquid two-phase flow makes the swirling motion. Use of the semicircular flow-guide slope plates 42 leads to an advantage of easy fabrication of the guide device.

It is, of course, possible to provide the flow-guide slope plates 42 also in the connecting pipe 18 shown in FIG. 2 as a part of the guide device.

While the present invention has been described with reference to preferred embodiments, it is understood that the present invention is not limited to the embodiments described above, and various changes and modifications may be made within the scope of the inventive concept as expressed herein.

What is claimed is:

1. A polishing apparatus comprising:
a polishing table having a polishing surface;
a top ring for holding a substrate and pressing the substrate against the polishing surface of the polishing table;
a processing liquid supply nozzle for supplying a processing liquid to the polishing surface of the polishing table;
a drain receiver, disposed around the polishing table, for recovering a gas-liquid two-phase flow that has been removed from the polishing table; and
a gas-liquid separator,
the gas-liquid separator comprising:
a container having a bottom and a side portion, the bottom having a liquid discharge outlet and the side portion having a gas discharge outlet;
a gas-liquid introduction pipe for introducing the gas-liquid two-phase flow into the container, the gas-liquid introduction pipe extending downward from above the container and having a lower end located in an interior of the container, the gas discharge outlet of the container being located above the lower end of the gas-liquid introduction pipe; and
a guide device disposed in the gas-liquid introduction pipe and configured so as to impart a swirling motion to the gas-liquid two-phase flow in the gas-liquid introduction pipe.

2. The polishing apparatus according to claim 1, wherein the guide device comprises a spiral flow-guide plate whose side end surfaces are secured to an inner circumferential surface of the gas-liquid introduction pipe and whose upper and lower end surfaces are twisted at least 180 degrees with respect to a cross-section of the spiral flow-guide plate located at a center of the spiral flow-guide plate.

3. The polishing apparatus according to claim 1, wherein the guide device comprises a plurality of semicircular flow-guide slope plates each having a circular arc portion secured to an inner circumferential surface of the gas-liquid introduction pipe, the plurality of semicircular flow-guide slope plates being disposed alternately at angular intervals of 180 degrees and arranged at predetermined intervals along a height direction of the gas-liquid introduction pipe, and each of the semicircular flow-guide slope plates being inclined downward with respect to a horizontal plane along a swirling direction of the gas-liquid two-phase flow and being inclined downward with respect to a horizontal plane along an axial direction of the gas-liquid introduction pipe.

4. The polishing apparatus according to claim 1, further comprising:
an exhaust pipe coupled to the gas discharge outlet, the exhaust pipe being inclined upward at a predetermined angle with respect to a horizontal plane.

* * * * *